US011822993B2

(12) United States Patent
He et al.

(10) Patent No.: US 11,822,993 B2
(45) Date of Patent: Nov. 21, 2023

(54) SLOT-TYPE ULTRA-WIDEBAND DEPOLARIZED CHIPLESS RFID TAG (71) Applicant: ZHEJIANG UNIVERSITY, Zhejiang (CN)

(72) Inventors: Shibo He, Hangzhou (CN); Jiming Chen, Hangzhou (CN); Zhiguo Shi, Hangzhou (CN); Yuhao Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/978,245

(22) Filed: Nov. 1, 2022

(65) Prior Publication Data
US 2023/0048754 A1  Feb. 16, 2023

Related U.S. Application Data (63) Continuation of application No. PCT/CN2021/102897, filed on Jun. 29, 2021.

(30) Foreign Application Priority Data

Sep. 4, 2020 (CN) .......................... 202010923078.6

(51) Int. Cl.
G06K 19/077 (2006.01)

(52) U.S. Cl.
CPC .............. *G06K 19/07773* (2013.01)

(58) Field of Classification Search
CPC ......... G06K 19/07773; G06K 19/0672; G06K 19/0772; G06Q 10/083

(Continued)

(56) References Cited

U.S. PATENT DOCUMENTS

2016/0379021 A1  12/2016 Bellows
2018/0227697 A1  8/2018 Norris
(Continued)

FOREIGN PATENT DOCUMENTS

CN 106295765 A 1/2017
CN 106486739 A 3/2017
(Continued)

OTHER PUBLICATIONS

International Search Report (PCT/CN2021/102897); dated Sep. 23, 2021.

(Continued)

*Primary Examiner* — Thien M Le
*Assistant Examiner* — Tae W Kim
(74) *Attorney, Agent, or Firm* — W&G Law Group (57) ABSTRACT Disclosed is a slot-type ultra-wideband depolarized chipless RFID tag. The tag comprises a tag slot unit, a metal plate and a dielectric substrate, wherein the tag slot unit is formed by means of etching the metal plate, and is located on the upper surface of the dielectric substrate; the tag slot unit is composed of at least four annular slot groups, and tags are distributed in a centrosymmetric manner; and each annular slot group is composed of four concentric annular slots that are distributed in a nested manner; a transceiver antenna TX transmits a horizontally polarized electromagnetic wave; a scattered wave obtained; a transceiver acquires a frequency spectrum of the scattered wave; the spectrum is converted into a time-domain signal; a response of the tag is extracted; and an MFCC feature of the time-domain signal is extracted.

7 Claims, 7 Drawing Sheets (58) Field of Classification Search
USPC .......................................................... 235/492
See application file for complete search history.

(56) References Cited

U.S. PATENT DOCUMENTS

2018/0322319 A1  11/2018  Gibson et al.
2019/0116449 A1   4/2019  Norris

FOREIGN PATENT DOCUMENTS

| | | |
|---|---|---|
| CN | 206115466 U | 4/2017 |
| CN | 107038471 A | 8/2017 |
| CN | 108682969 A | 10/2018 |
| CN | 109766929 A | 5/2019 |
| CN | 111227839 A | 6/2020 |
| CN | 112241776 A | 1/2021 |
| JP | 2021018808 A | 2/2021 |
| JP | 2021089725 A | 6/2021 |
| WO | 2021117298 A1 | 6/2021 |
| WO | 2021240996 A1 | 12/2021 |

OTHER PUBLICATIONS

CN First Office Action(202010923078.6); dated Sep. 2, 2021.
CN Notice of Allowance(202010923078.6); dated Apr. 7, 2022.
JP Notice of Allowance(JP2022-548820); dated Mar. 8, 2023.
A-Novel-Passive-Chipless-RFID-Tag-for-Angle-Sensor.

SLOT-TYPE ULTRA-WIDEBAND DEPOLARIZED CHIPLESS RFID TAG

CROSS-REFERENCE TO RELATED APPLICATIONS

The present application is a continuation of International Application No. PCT/CN2021/102897, filed on Jun. 29, 2021, which claims priority to Chinese Application No. 202010923078.6, filed on Sep. 4, 2020, the contents of both of which are incorporated herein by reference in their entireties.

TECHNICAL FIELD

The present disclosure relates to the field of chipless RFID and in particular to a slot-type ultra-wideband depolarized chipless RFID tag.

BACKGROUND

In the logistics industry, the most important thing is to track and manage the transportation process of goods, and warehousing management is a crucial part. At present, in warehouse management, the barcode technology is mainly used to identify goods. However, the identification technology based on barcode has certain limitations: it needs to manually target the barcode during scanning, and there must be no occlusion between the barcode and the scanner. It can be seen that although the bar code cost is low, it will produce a large labor cost. Today, with the huge volume of express goods, a low-cost goods identification solution is urgently required for warehouse management.

RFID is a typical communication technology in the Internet of Things. The principle is that a RFID tag collects the energy of an electromagnetic wave emitted by a RFID reader, and excites the integrated chip in the tag, so that the integrated chip scatters the information contained in the tag through the electromagnetic wave, and the reader can obtain the information contained in the tag after receiving the scattered wave, thus implementing non-contact data communication with the tag and achieving the purpose of identifying the tag target. Therefore, compared with the barcode technology used in the current warehouse, the object recognition technology based on a RFID tag has the features of no need to target the object, allowing the presence of occlusion between the tag and the reader. In addition, its performance in updating information, storing information, working efficiency, security and the like is relatively better, which can well meet the needs of current social development.

However, it cannot be ignored that the manufacturing cost of RFID tags is higher than that of barcodes. At present, with the trend of "centralized" and "large-scale" warehouse management, the use of RFID tag identification technology will result in high manufacturing costs, thus greatly reducing the enthusiasm of the market for using the RFID identification technology. Under this background, it is an urgent research work to reduce the manufacturing cost of the RFID technology.

The most expensive part of RFID tag manufacturing is the integrated chip. However, RFID technology, which adopts the design solution of a chipless RFID tag, is a relatively new research direction, and there is little research related to this new field.

SUMMARY

In order to overcome the shortcomings of the prior art, the present disclosure provides a slot-type ultra-wideband depolarized chipless RFID tag.

The purpose of the present disclosure is implemented by the following technical solution: including a tag slot unit, a metal plate and a dielectric substrate. The tag slot unit is formed by means of etching the metal plate and is located on an upper surface of the dielectric substrate; the tag slot unit is composed of at least four annular slot groups, tags are distributed in a centrosymmetric manner, and each of the annular slot groups is composed of four concentric annular slots that are distributed in a nested manner; each annular slot of each annular slot group implements MFCC (Mel-scale Frequency Cepstral Coefficients) feature coding in a specific frequency band; a transceiver antenna TX emits a horizontally polarized electromagnetic wave to serve as an interrogation signal, and the scattered wave obtained after the signal is reflected by the tag is acquired by the transceiver antenna TX; the transceiver acquires a frequency spectrum of the scattered wave, and the frequency spectrum is converted into a time-domain signal by an inverse Fourier transform; firstly, pre-emphasis is performed, and then a short-time Fourier transform is performed by using a time window of 10 ns and a window moving step of 5 ns to extract a 12-dimensional MFCC feature value of each frame; the tag implements an MFCC feature coding mode of 2-8 GHz, and can implement 16-bit coding in total.

Further, the tag slot unit is composed of four annular slot groups obtained by means of hollowing out the metal plate, and the four annular slot groups are arranged in a 2×2 manner and have a centrosymmetric structure; four centers of the four annular slot groups form four vertices of a rectangle.

Further, the annular slot group consists of four annular slots with a slot width of 0.2 mm, and a size of each annular slot is represented by an outer diameter thereof.

Further, the outer diameters of the annular slots of two non-diagonal annular slot groups from inside to outside are as follows: S1 is 5.8 mm, S2 is 8 mm, S3 is 11.5 mm, S4 is 14 mm, S5 is 4.7 mm, S6 is 6.7 mm, S7 is 10 mm and S8 is 13.2 mm.

Further, the dielectric substrate is a rectangular plate of 64 mm×64 mm, made of a FR-4 material, with a thickness of 0.4 mm; the four annular slot groups are obtained by means of etching and hollowing out a whole copper plate with a size of 64×64 mm; the annular slot is a hollowed-out part, and a thickness of the copper plate is 0.05 mm.

Further, the tags are distributed in a centrosymmetric manner, forming a topological structure that can be extended periodically without affecting the feature value, and only increasing an intensity of the scattered wave, thus enhancing a frequency spectrum response of the tag.

Further, each annular slot of each annular slot group implements an MFCC feature value with a specific value.

Further, a mode of the MFCC feature coding is as follows: extracting an MFCC feature of a time-domain signal of a tag scattered wave, and distinguishing an MFCC feature value change caused by every 0.3 mm change of a size of the annular slot when a machine precision allows, so as to implement discrimination of the tags.

Further, the transceiver antenna TX can not only send an access electromagnetic wave, but also detect the tag scattered wave, and a working frequency range of the transceiver antenna TX is wider than a frequency range of 2-8 GHz.

The present disclosure has the following advantages.

The present disclosure provides a low-cost chipless RFID tag which works in 2-8 GHz frequency band, adopts the depolarization technology and can be used for commodity coding. In front of the tag, a linearly polarized wave is vertically transmitted to the tag as an interrogation signal.

If a horizontally linearly polarized electromagnetic wave is incident on the surface of the tag, the tag receives the energy of the incident wave and generates a scattered wave. S11 parameters can be measured by a vector network analyzer to obtain the frequency spectrum of the scattered wave. The frequency spectrum is converted into a time-domain signal by an inverse Fourier transform. Firstly, pre-emphasis is carried out, and then, a short-time Fourier transform is performed by using a time window of 10 ns and a window moving step of 5 ns, and then a 12-dimensional MFCC feature value of each frame is extracted to implement feature coding.

Annular slots of different sizes are formed into an annular slot group by the inner nesting technology, which can improve the utilization ratio of the surface space of the dielectric substrate and the coding capacity density of the tag.

DESCRIPTION OF EMBODIMENTS

The present disclosure will be further explained in detail with reference to the following embodiments and drawings, but the embodiments of the present disclosure are not limited thereto.

Embodiments

Figure 1:
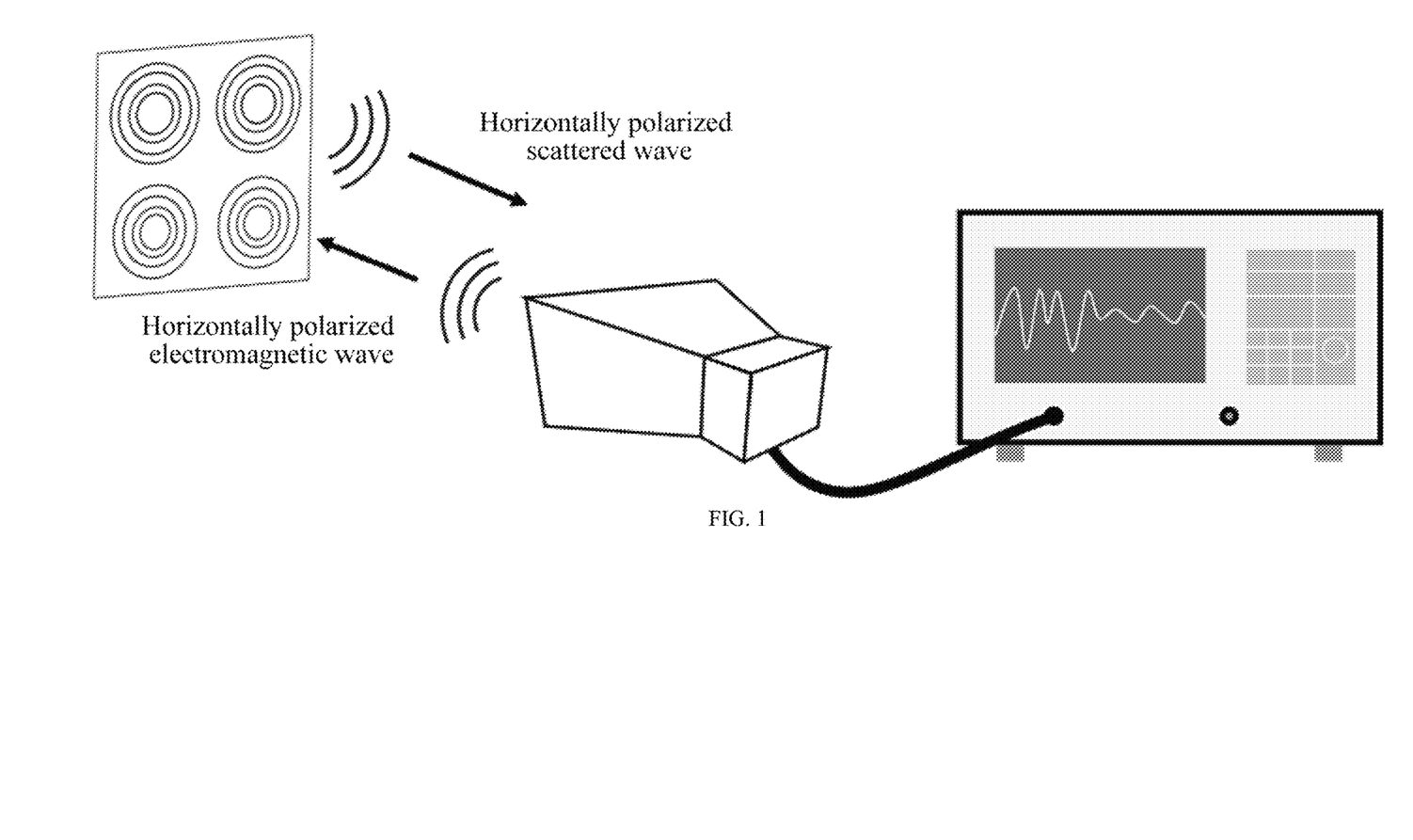
FIG. 1 is a structural diagram of the working system of a slot-type ultra-wideband depolarized chipless RFID tag according to the present disclosure.

As shown in FIG. 1, a working system of a slot-type ultra-wideband depolarized chipless RFID tag is composed of a RFID reader, a transceiver antenna TX and a tag. The transceiver antenna TX emits a horizontally polarized electromagnetic wave to serve as an interrogation signal, and a scattered wave obtained after the signal is reflected by the tag can be acquired by a transceiver antenna TX. The transceiver acquires the frequency spectrum of the scattered wave, and the frequency spectrum is converted into a time-domain signal by an inverse Fourier transform. Firstly, pre-emphasis is carried out, then a short-time Fourier transform is performed by using a time window of 10 ns and a window moving step of 5 ns, and then a 12-dimensional MFCC (Mel Frequency Cepstrum Coefficient) feature value of each frame is extracted to implement feature coding.

Figure 2:
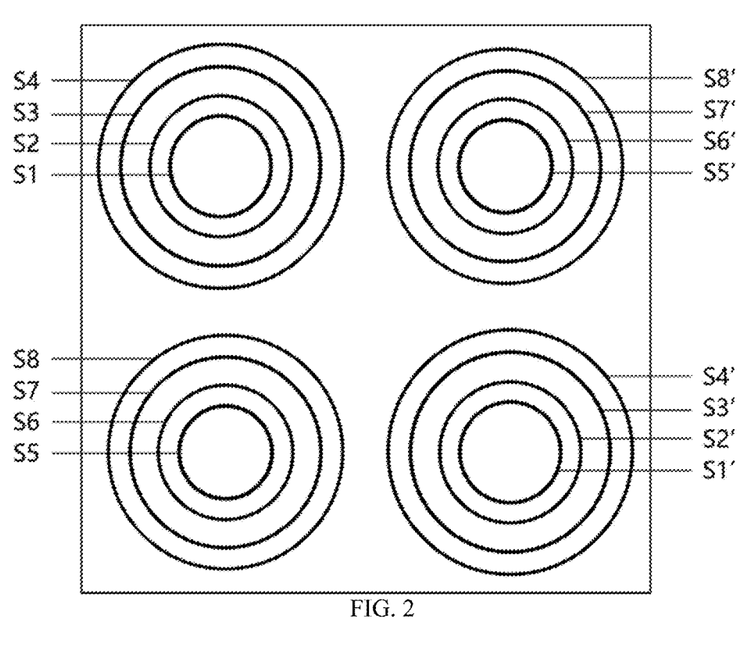
FIG. 2 is a plan view of a slot-type ultra-wideband depolarized chipless RFID tag according to the present disclosure.

As shown in FIG. 2, a slot-type ultra-wideband depolarized chipless RFID tag works in a 2-8 GHz frequency band, and includes a tag slot unit, a metal plate and a dielectric substrate. The tag slot unit is formed by means of etching the metal plate and is located on the upper surface of the dielectric substrate.

The tag slot unit is composed of at least four annular slot groups, the tags are distributed in a centrosymmetric manner, and each annular slot group is composed of four concentric annular slots. Each slot of each annular slot group implements MFCC feature coding of a specific frequency band. Two annular slots with diagonal symmetry are called a pair of annular slots.

The coding implemented by the present disclosure is based on the corresponding relationship between the MFCC feature change of the scattered wave and the radius of the annular slot. Generally speaking, if only the radius of a pair of annular slots is changed, a regular change of the feature value will be generated in the MFCC feature map. Therefore, if the radius of a pair of annular slots decreases by 0.3 mm, increases by 0.3 mm or increases by 0.6 mm on the basis of its standard size, four distinguishable MFCC feature values will be generated, thus implementing 2-bit coding.

In this embodiment, the tag slot unit is composed of four concentric annular slot groups, each group is composed of four concentric annular slots S1-S4, S5-S8, S1'-S4', S5'-S8', and each pair corresponds to the annular slot, and one MFCC feature coding can be implemented. For example, S1 and S1' are a pair of annular slots. A pair of annular slots are used to enhance the strength and identifiability of echo signals.

In this embodiment, the width of each annular slot is 0.2 mm, and each pair of corresponding annular slots has the same size due to the central symmetry. The outside diameters of S1-S8 annular slots are: S1 is 5.8 mm, S2 is 8 mm, S3 is 11.5 mm, S4 is 14 mm, S5 is 4.7 mm, S6 is 6.7 mm, S7 is 10 mm and S8 is 13.2 mm.

In this embodiment, the dielectric substrate is made of a FR-4 material with a relative dielectric constant of 5.5 and an electrical loss tangent value of 0.035. The substrate is a rectangular plate of 64 mm×64 mm with a thickness of 0.4 mm. The metal plate used is made of copper with a thickness of 0.05 mm.

Figure 3A:
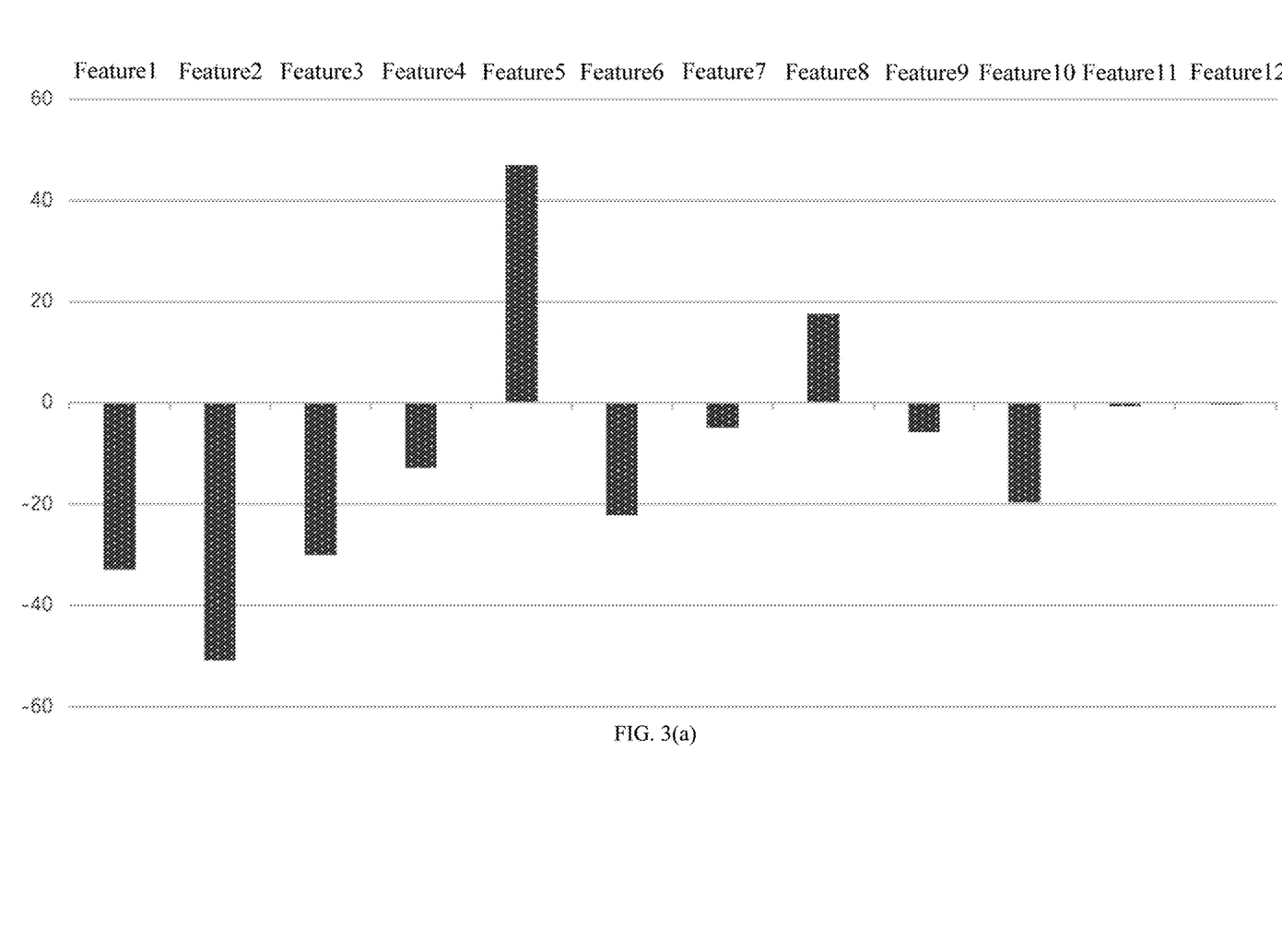
FIG. 3(a) is a 12-dimensional MFCC feature value of the first frame extracted from a slot-type ultra-wideband depolarized chipless RFID tag of the present disclosure based on FIG. 2.

As shown in the tag in FIG. 2, each annulus can implement 2-bit MFCC feature coding, and there are 8 annuluses in total, so a total of 16-bit coding can be implemented. The diagram of the MFCC feature numerical value is shown in FIG. 3(a).

Figure 3B:
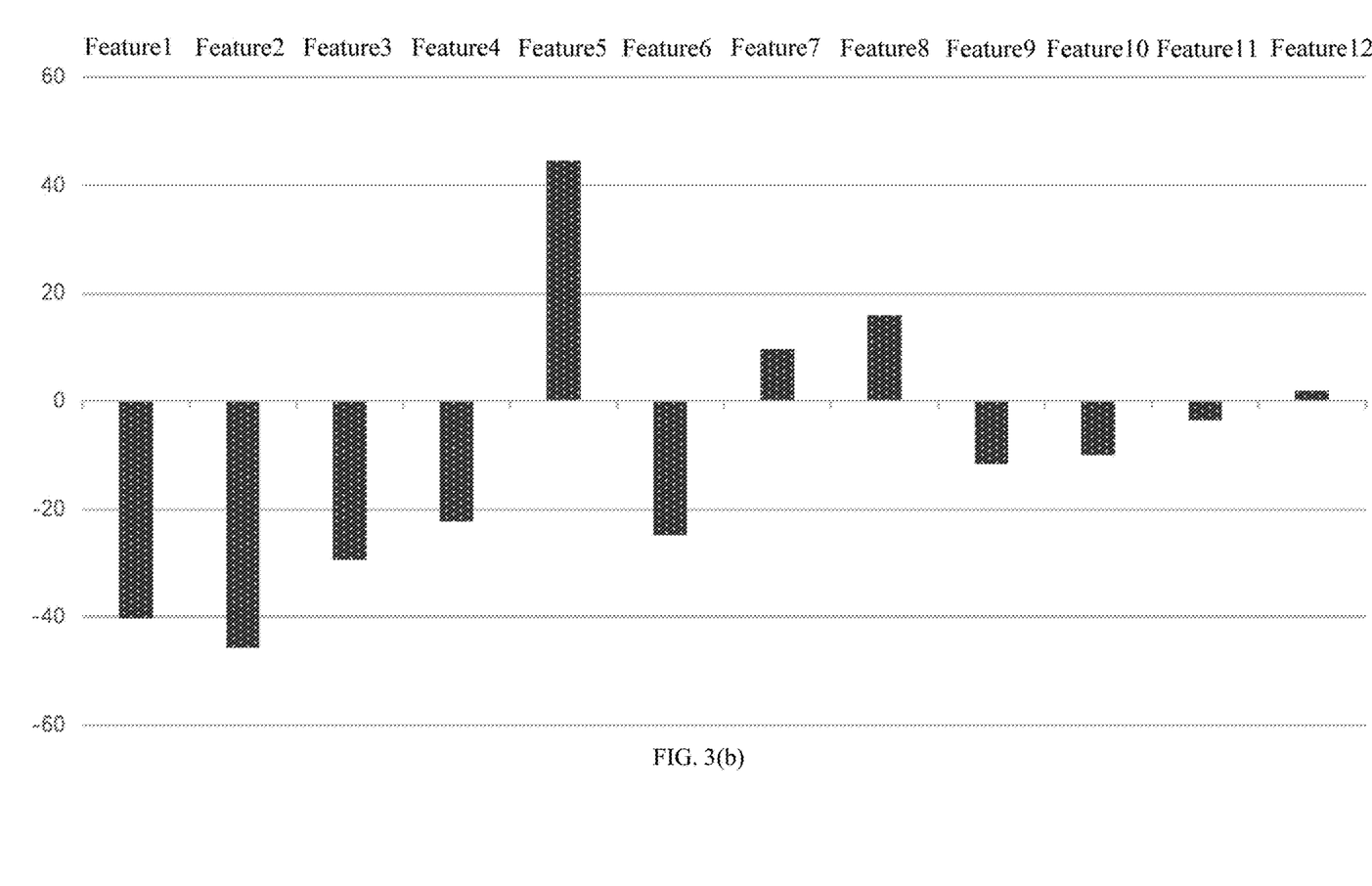
FIG. 3(b) is a 12-dimensional MFCC feature value of the first frame extracted from a slot-type ultra-wideband depolarized chipless RFID tag according to the present disclosure by reducing the radius of S6 by 0.3 mm based on FIG. 3(a).

As shown in FIG. 3(b), when the size of S6 and S6' in this embodiment is reduced by 0.3 mm, the corresponding MFCC feature value has a distinguishable change, for example, the feature 7 changes from a positive value to a negative value.

Figure 3C:
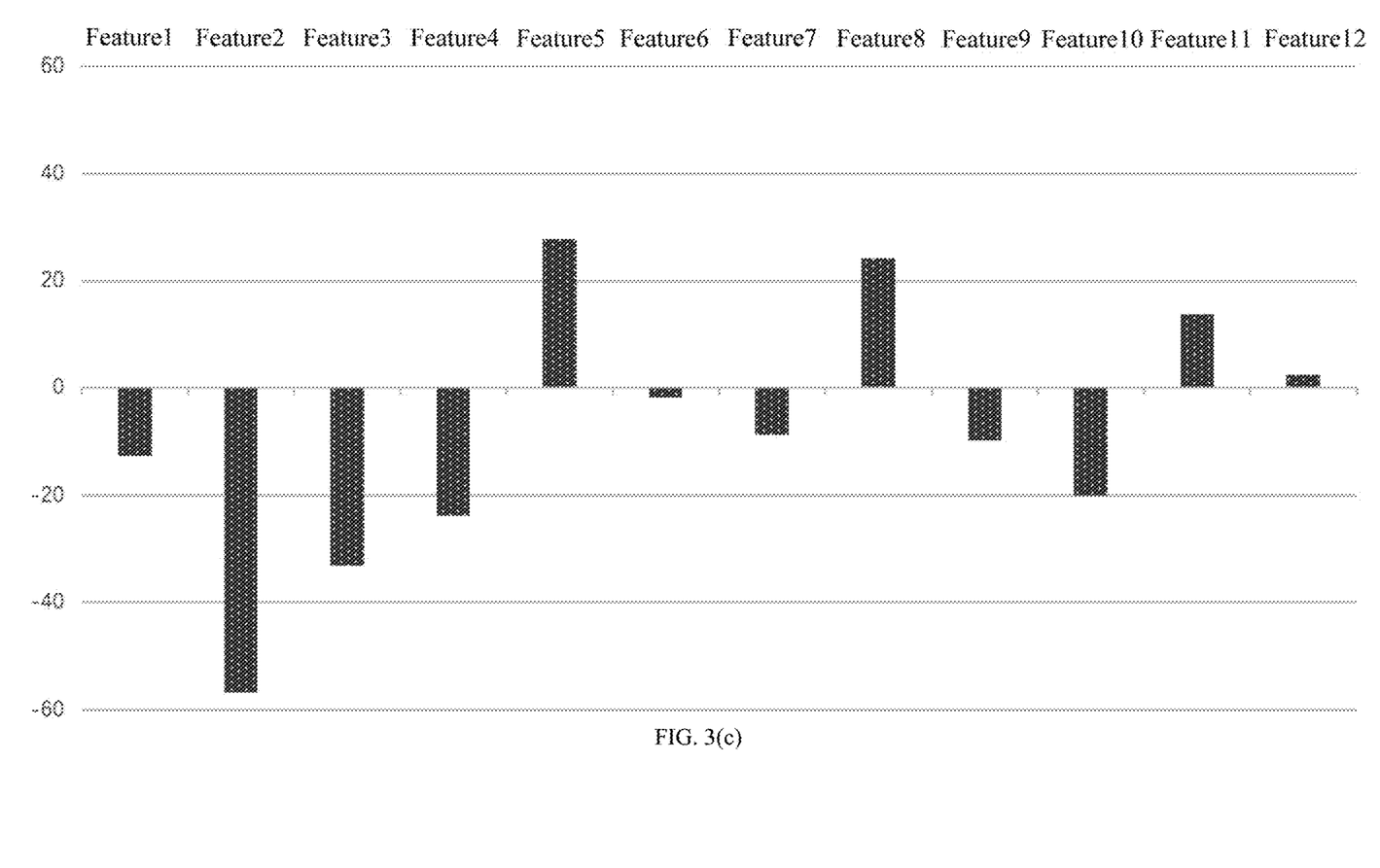
FIG. 3(c) is the 12-dimensional MFCC feature value of the first frame extracted from a slot-type ultra-wideband depolarized chipless RFID tag according to the present disclosure by increasing the radius of S6 by 0.3 mm on the basis of FIG. 3(a).

As shown in FIG. 3(c), when the size of S6 and S6' in this embodiment is increased by 0.3 mm, the corresponding MFCC feature value has a distinguishable change, for example, the feature 11 changes from a negative value to a positive value.

Figure 3D:
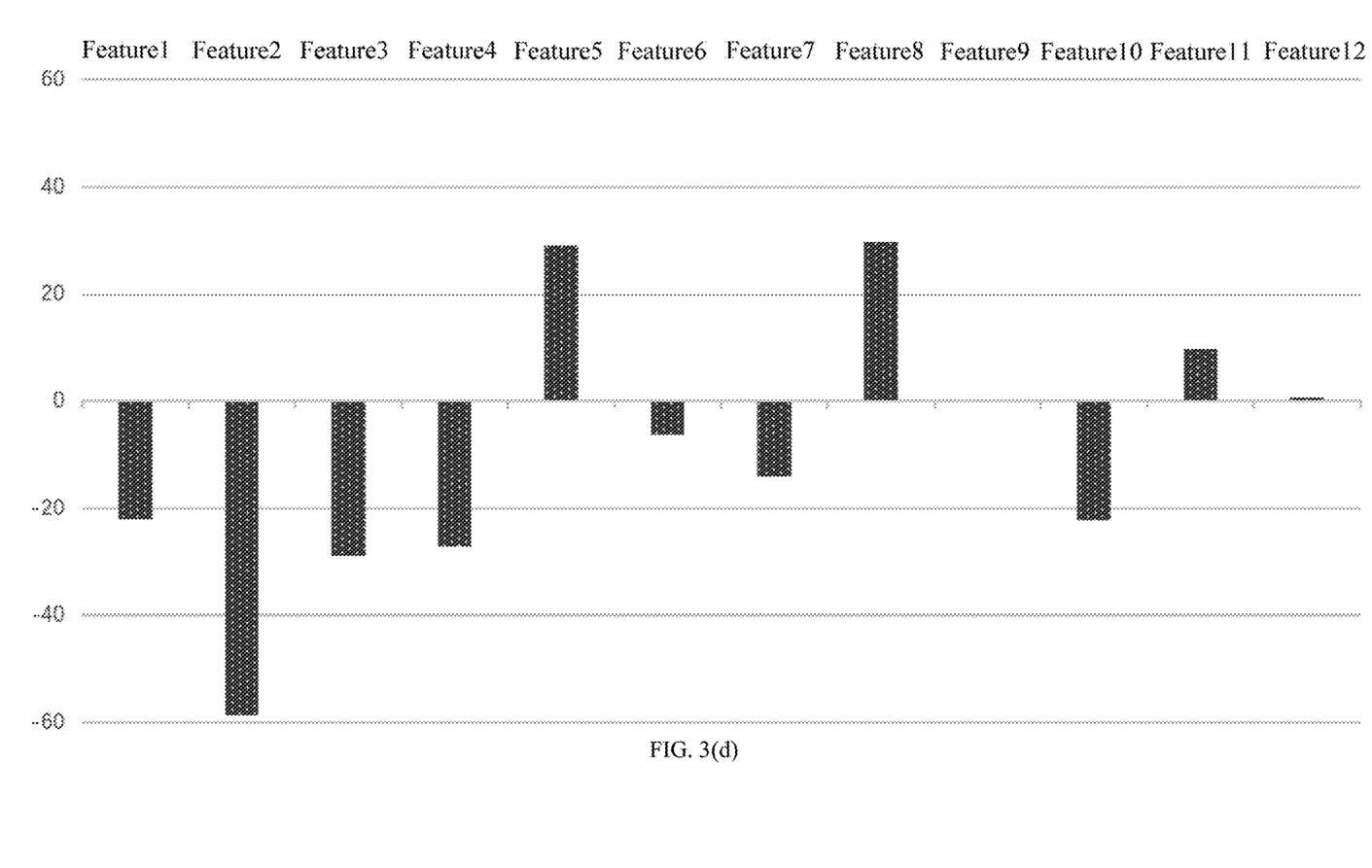
FIG. 3(d) is the 12-dimensional MFCC feature value of the first frame extracted from a slot-type ultra-wideband depolarized chipless RFID tag according to the present disclosure by increasing the radius of S6 by 0.6 mm based on FIG. 3(a).

As shown in FIG. 3(d), when the size of S6 and S6' in this embodiment is increased by 0.6 mm, the corresponding MFCC feature value has a distinguishable change, for example, the feature 9 changes from a negative value to 0.

Figure 4:
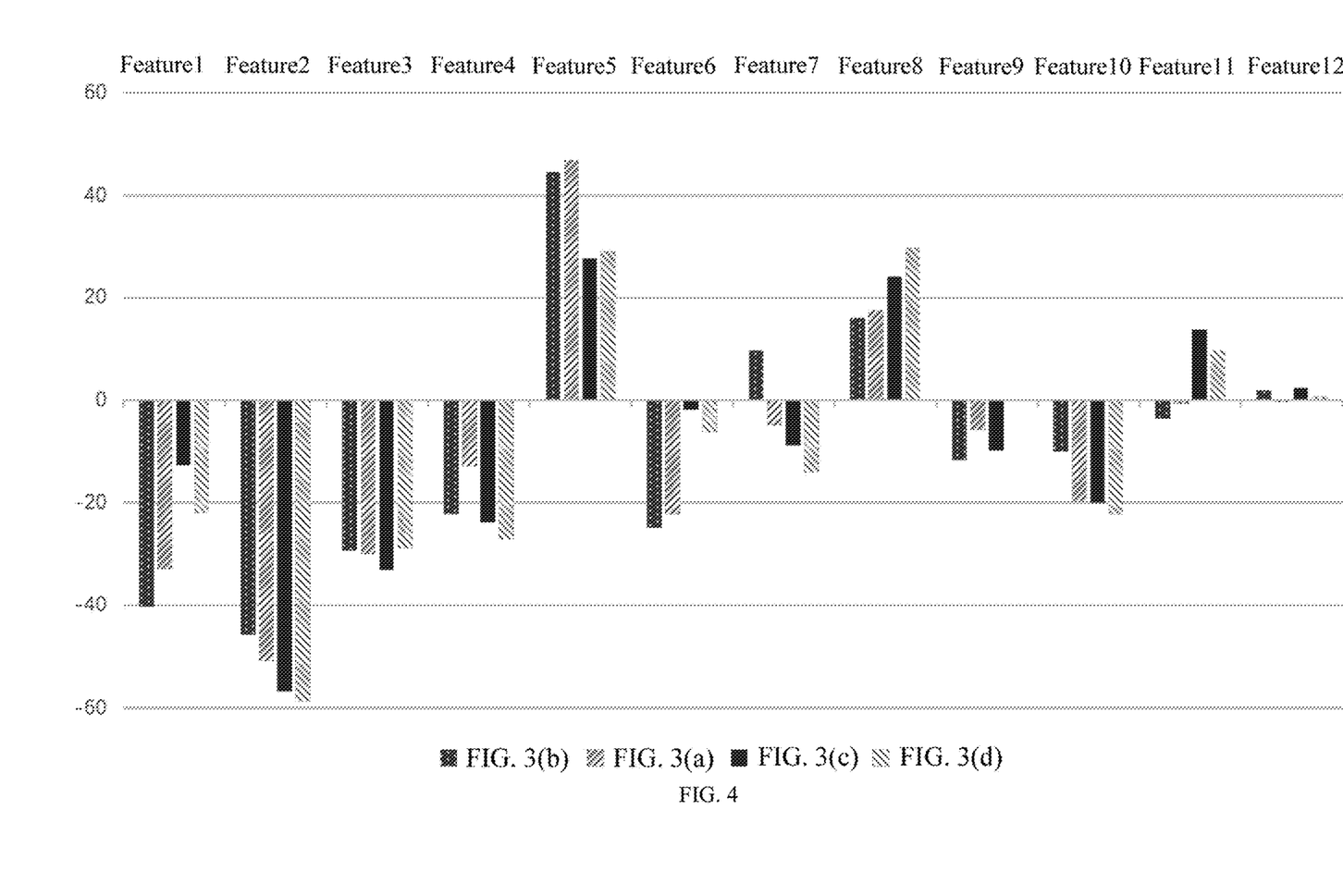
FIG. 4 is a comparison diagram of the results of FIG. 3(a), FIG. 3(b), FIG. 3(c) and FIG. 3(d) of a slot-type ultra-wideband depolarized chipless RFID tag according to the present disclosure.

As shown in FIG. 4, the 12-dimensional MFCC feature values in FIG. 3(a), FIG. 3(b), FIG. 3(c) and FIG. 4(d) have obvious distinguishable numerical differences. By using machine learning algorithms such as decision tree and support vector machine to train the MFCC feature value, identification of different tags can be achieved finally.

The slot-type ultra-wideband depolarized chipless RFID tag has the advantages of a low cost, a strong anti-interference ability, easy detection in actual environment and a large coding capacity.

The above embodiments are typical embodiments of the present disclosure, but the embodiments of the present disclosure are not limited by these embodiments. Any other changes, modifications, substitutions, combinations and simplifications made without departing from the spirit and principle of the present disclosure should be equivalent replacement methods, which shall be included in the scope of protection of the present disclosure.

What is claimed is:

1. A system comprising a slot-type ultra-wideband depolarized chipless RFID tag and a corresponding reader, wherein the slot-type ultra-wideband depolarized chipless RFID tag comprising a tag slot unit, a metal plate and a dielectric substrate; wherein the tag slot unit is formed by means of etching the metal plate and is located on an upper surface of the dielectric substrate; the tag slot unit is composed of at least four annular slot groups, tags are distributed in a centrosym metric manner, and each of the annular slot groups is composed of four concentric annular slots that are distributed in a nested manner; each annular slot of each annular slot group implements MFCC feature coding in a specific frequency band, and a mode of the MFCC feature coding is as follows:

extracting by the reader an MFCC feature of a time-domain signal of a tag scattered wave, and distinguishing an MFCC feature value change caused by every 0.3 mm change of a size of the annular slot when a machine precision allows, so as to implement discrimination of the tags;

emitting, by a transceiver antenna TX of the reader, a horizontally polarized electromagnetic wave to serve as an interrogation signal, and acquiring, by the transceiver antenna TX, a scattered wave obtained after the signal is reflected by the tag;

acquiring, by the transceiver of the reader, a frequency spectrum of the scattered wave, and converting the frequency spectrum into a time-domain signal by an inverse Fourier transform;

wherein by the reader firstly, pre-emphasis is performed, and then a short-time Fourier transform is performed by using a time window of 10 ns and a window moving step of 5 ns to extract a 12-dimensional MFCC feature value of each frame; and wherein the transceiver antenna TX of the reader is capable of sending an access electromagnetic wave and detecting the tag scattered wave, and a working frequency range of the transceiver antenna TX is wider than a frequency range of 2-8 GHz; and implementing, by the tag, an MFCC feature coding mode of 2-8 GHz, and a 16-bit coding in total.

2. The slot-type ultra-wideband depolarized chipless RFID tag according to claim 1, wherein the tag slot unit is composed of four annular slot groups obtained by means of hollowing out the metal plate, and the four annular slot groups are arranged in a 2×2 manner and have a centrosymmetric structure; and four centers of the four annular slot groups form four vertices of a rectangle.

3. The slot-type ultra-wideband depolarized chipless RFID tag according to claim 2, wherein the annular slot group consists of four annular slots with a slot width of 0.2 mm, and a size of each annular slot is represented by an outer diameter thereof.

4. The slot-type ultra-wideband depolarized chipless RFID tag according to claim 3, wherein the outer diameters of the annular slots of two non-diagonal annular slot groups from inside to outside are as follows: S1 is 5.8 mm, S2 is 8 mm, S3 is 11.5 mm, S4 is 14 mm, S5 is 4.7 mm, S6 is 6.7 mm, S7 is 10 mm and S8 is 13.2 mm.

5. The slot-type ultra-wideband depolarized chipless RFID tag according to claim 2, wherein the dielectric substrate is a rectangular plate of 64 mm×64 mm, made of a FR-4 material, with a thickness of 0.4 mm; the four annular slot groups are obtained by means of etching and hollowing out a whole copper plate with a size of 64×64 mm; the annular slot is a hollowed-out part, and a thickness of the copper plate is 0.05 mm.

6. The slot-type ultra-wideband depolarized chipless RFID tag according to claim 1, wherein the tags are distributed in a centrosymmetric manner, forming a topological structure which is capable of being extended periodically without affecting the feature value, but only increasing an intensity of the scattered wave, and thus enhancing a frequency spectrum response of the tag.

7. The slot-type ultra-wideband depolarized chipless RFID tag according to claim 1, wherein each annular slot of each annular slot group implements an MFCC feature value with a specific value.

* * * * *